United States Patent
de Oliveira et al.

(10) Patent No.: US 12,264,822 B2
(45) Date of Patent: Apr. 1, 2025

(54) STORABLE GRIDDLE-GRILL

(71) Applicant: WHIRLPOOL CORPORATION, Benton Harbor, MI (US)

(72) Inventors: Eber Elias Mendes de Oliveira, Santa Catarina (BR); Ivana Helena Grochowicz, Santa Catarina (BR); Lucas Borba de Melo, Santa Catarina (BR); Pedro Augusto Barbosa Santos, Santa Catarina (BR); Maiara Pereira Westarb, Santa Catarina (BR)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 434 days.

(21) Appl. No.: 17/750,466

(22) Filed: May 23, 2022

(65) Prior Publication Data
US 2023/0375179 A1    Nov. 23, 2023

(51) Int. Cl.
F24C 15/14        (2006.01)
F24C 1/16         (2021.01)

(52) U.S. Cl.
CPC ............ *F24C 1/16* (2013.01); *F24C 15/14* (2013.01)

(58) Field of Classification Search
CPC .. A47J 37/067; A47J 37/0682; A47J 37/0713; A47J 2037/0777; F24C 15/107; F24C 15/30; F24C 15/10; F24C 15/103
USPC ......................................... 126/211, 25 R, 29
See application file for complete search history.

(56) References Cited

U.S. PATENT DOCUMENTS

| | | | |
|---|---|---|---|
| 2,207,307 A | 7/1940 | Teller et al. | |
| 4,046,132 A | 9/1977 | White | |
| 4,149,515 A | 4/1979 | Hayes | |
| 5,873,355 A | 2/1999 | Schlosser et al. | |
| 5,884,554 A | 3/1999 | Sprick | |
| 7,021,308 B2 * | 4/2006 | Caruso | A47B 46/00 108/50.13 |
| 2010/0300305 A1 * | 12/2010 | Schon | F24C 15/10 99/380 |
| 2014/0261009 A1 | 9/2014 | Bringe et al. | |
| 2017/0332839 A1 * | 11/2017 | Dahle | F24C 3/14 |
| 2020/0345178 A1 | 11/2020 | Yasseen | |
| 2021/0315416 A1 * | 10/2021 | Fullmer | F24C 15/12 |
| 2021/0369053 A1 | 12/2021 | Grand | |

FOREIGN PATENT DOCUMENTS

| | | | |
|---|---|---|---|
| DE | 102009015636 | 9/2010 | |
| EP | 3819547 | 12/2021 | |
| WO | 2012109708 | 8/2012 | |
| WO | WO-2012109708 A1 * | 8/2012 | .......... A47J 37/0713 |

OTHER PUBLICATIONS

Space Grill, "SGBBQG40 Instruction & Installation Manual" Pin Code: 0845CR-0011, Space-Grill.com, Nerang, Australia (undated).

* cited by examiner

*Primary Examiner* — Steven B McAllister
*Assistant Examiner* — Amy E Carter
(74) *Attorney, Agent, or Firm* — PRICE HENEVELD LLP

(57) ABSTRACT

A heating surface is rotatably coupled to an appliance such that it can be rotated between a use position and a stored position. The heating surface includes a grease container that collects grease and other material from the cooking surface. When the heating surface is in a use position, it is positioned above one or more heating elements on the appliance. When the heating surface is in a stored position, it is positioned behind the main body of the appliance.

20 Claims, 7 Drawing Sheets

STORABLE GRIDDLE-GRILL

BACKGROUND OF THE DISCLOSURE

The present disclosure generally relates to a cooking appliance with a storable griddle-grill surface that can be rotated between a storage position and a use position.

SUMMARY OF THE DISCLOSURE

According to one aspect of the present disclosure, an appliance includes a storable heating surface. The appliance has a front surface, a top surface, a rear surface, hinge pin grooves, and at least one heating element positioned on the top surface of the appliance. The heating surface has a top cooking surface, a lower surface positioned opposite the top cooking surface, a front surface with a handle, and a grease container positioned opposite the front surface. The grease container includes a top surface, a bottom surface, and two opposed sidewalls to define a grease collection cavity. The grease container also includes an opening adjacent to the top cooking surface to collect grease from the top cooking surface The grease container includes a hinge pin on each sidewall of the grease container. The hinge pins are received in the hinge pin grooves on the appliance. The heating surface can be rotated to a storage position with the heating surface positioned adjacent to the rear surface of the appliance with the top cooking surface being generally perpendicular to the top surface of the appliance. The heating surface can also be rotated to a use position, by movement of the hinge pins with respect to the hinge pin grooves, such that the lower surface of the heating surface is positioned above the at least one heating element and the top cooking surface of the heating surface is generally parallel to the top surface of the appliance.

According to another aspect of the present disclosure, a cooking appliance has a rotatable heating surface. The cooking appliance has a front surface, a top surface, a rear surface, hinge pin grooves, and at least one heating element positioned on the top surface of the c. The heating surface has a top cooking surface, a lower surface positioned opposite the top cooking surface, a front surface with a handle, and a grease container positioned opposite the front surface. The grease container includes a top surface, a bottom surface, and two opposed sidewalls to define a grease collection cavity. The grease container includes an opening adjacent to the top cooking surface to collect grease from the top cooking surface. The grease container includes a hinge pin on each sidewall of the grease container. The hinge pins are received in the hinge pin grooves of the range. The heating surface can be rotated to a storage position with the heating surface positioned adjacent to the rear surface of the cooking appliance with the top cooking surface being generally perpendicular to the top surface of the cooking appliance. The heating surface can also be rotated to a use position, by movement of the hinge pins with respect to the hinge pin grooves, such that the lower surface of the heating surface is positioned above the at least one heating element. The cooking appliance includes one or more other heating elements that are positioned on the top surface adjacent to the heating surface when the heating surface is in a use position.

According to yet another aspect of the present disclosure, a cooking appliance has a storable heating surface. The cooking appliance has a front surface, a top surface, a rear surface, hinge pin grooves, and a plurality of heating elements positioned on the top surface of the cooking appliance. The heating surface has a top cooking surface, a lower surface positioned opposite the top cooking surface, a front surface with a handle, and a grease container positioned opposite the front surface. The grease container includes a top surface, a bottom surface, and two opposed sidewalls to define a grease collection cavity. The grease container includes an opening adjacent to the top cooking surface to collect grease from the top cooking surface. The grease container also has a hinge pin on each sidewall of the grease container, which are received in the hinge pin grooves on the cooking appliance. The heating surface can be rotated to a stored position with the heating surface positioned adjacent to the rear surface of the cooking appliance with the top cooking surface being generally perpendicular to the top surface of the cooking appliance. The heating surface can also be rotated to a use position, by movement of the hinge pins with respect to the hinge pin grooves, such that the lower surface of the heating surface is positioned above at least one of the plurality of heating elements. When in the use position, the top cooking surface of the heating surface is generally parallel to the top surface of the cooking appliance and the top surface of other plurality of heating elements.

These and other features, advantages, and objects of the present disclosure will be further understood and appreciated by those skilled in the art by reference to the following specification, claims, and appended drawings.

Figure 4:
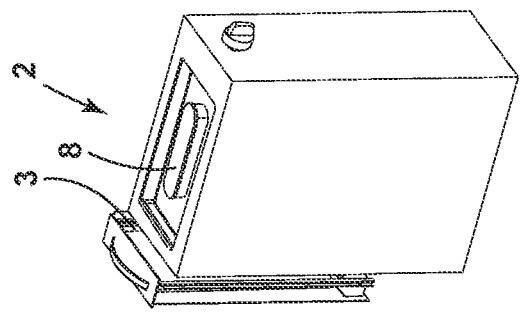
FIG. 4 is a side perspective view of the appliance shown in FIG. 1 with the heating surface shown in a stored position.
Figure 3:
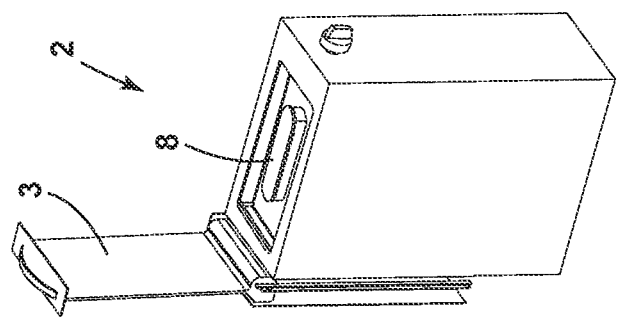
FIG. 3 is a side perspective view of the appliance shown in FIG. 1 with the heating surface shown in a rotated vertical position.
Figure 2:
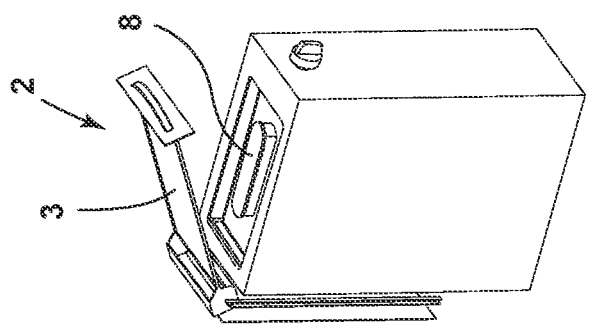
FIG. 2 is a side perspective view the appliance shown in FIG. 1 with the heating surface shown in a partially rotated position.

The components in the figures are not necessarily to scale, emphasis instead being placed upon illustrating the principles described herein.

DETAILED DESCRIPTION

The present illustrated embodiments reside primarily in combinations of method steps and apparatus components related to a bottom vent assembly for a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
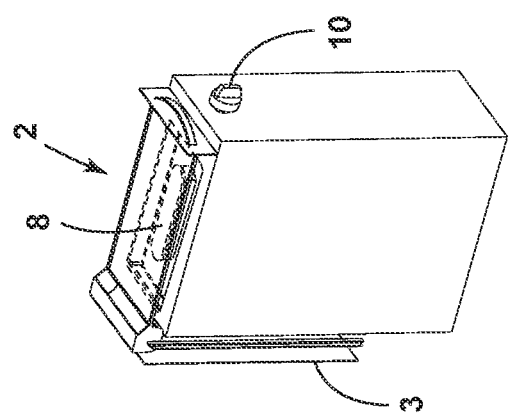
FIG. 1 is a side perspective view of an appliance with a storable heating surface according to one aspect of the present disclosure.
Figure 5:
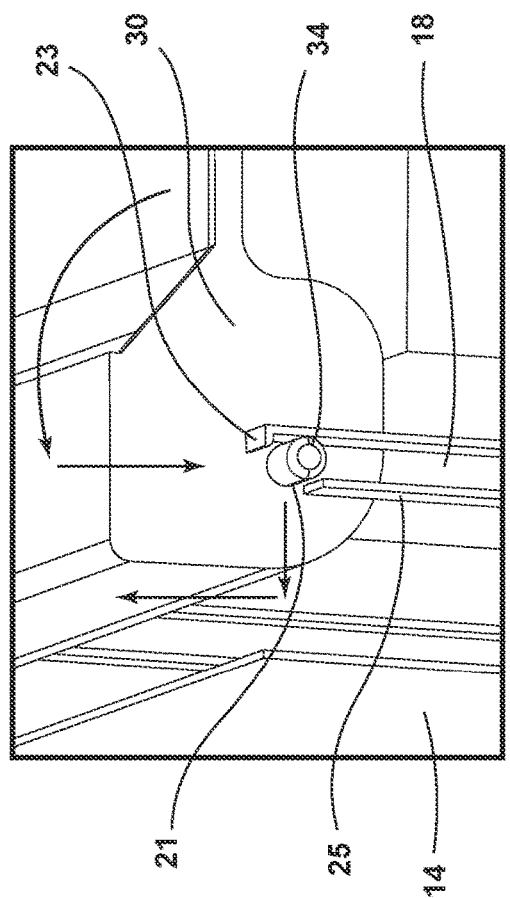
FIG. 5 is a side view of the hinge pin and hinge groove for the appliance shown in FIG. 1.
Figure 6:
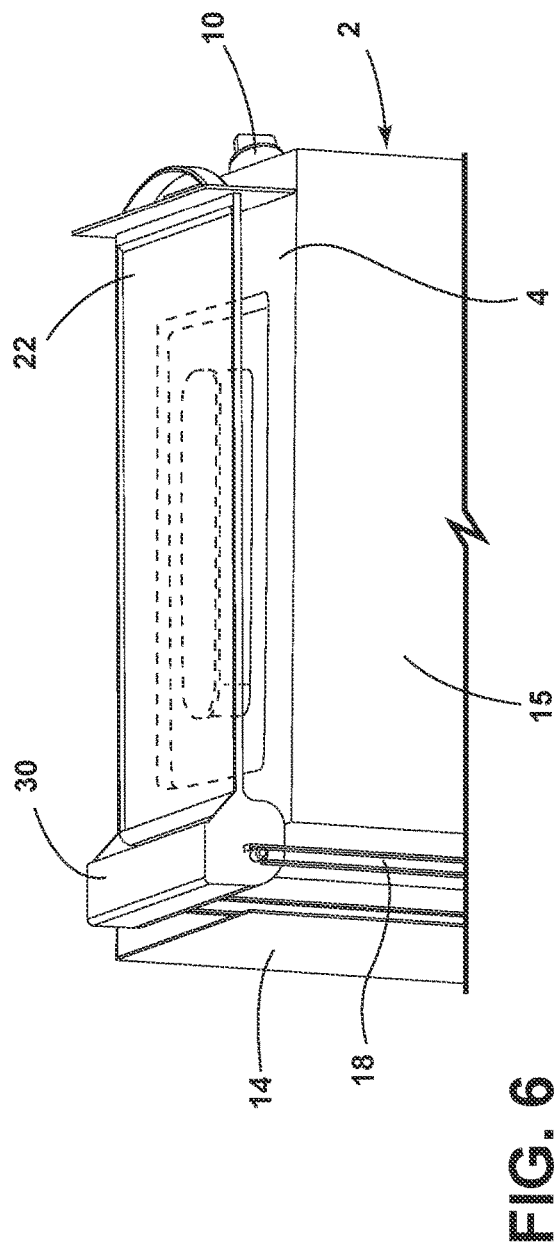
FIG. 6 is a partial side elevational view with the heating surface shown in a use position.
Figure 7:
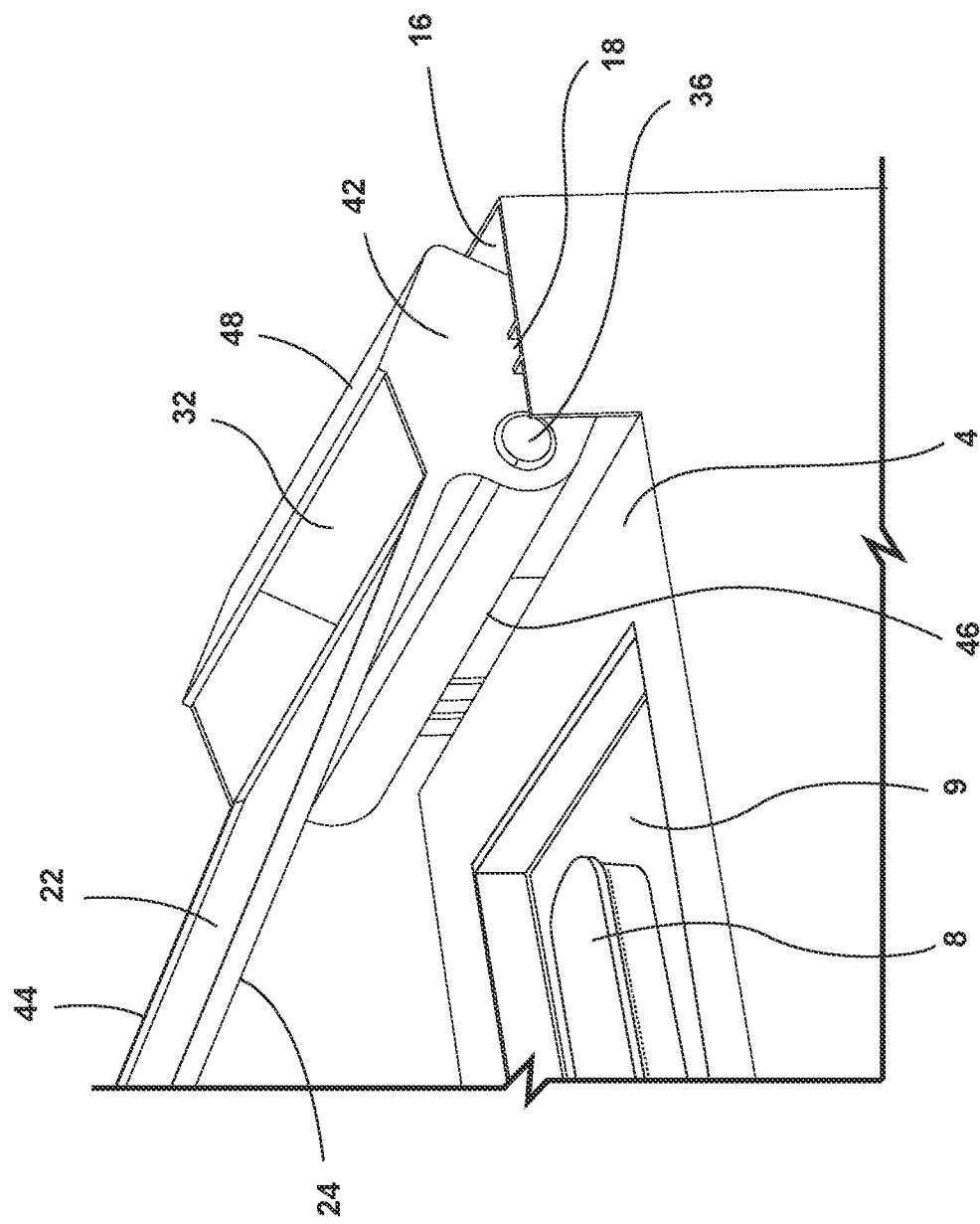
FIG. 7 is a partial side perspective view of the appliance shown in FIG. 1 with the heating surface shown in a partially rotated position.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 11:
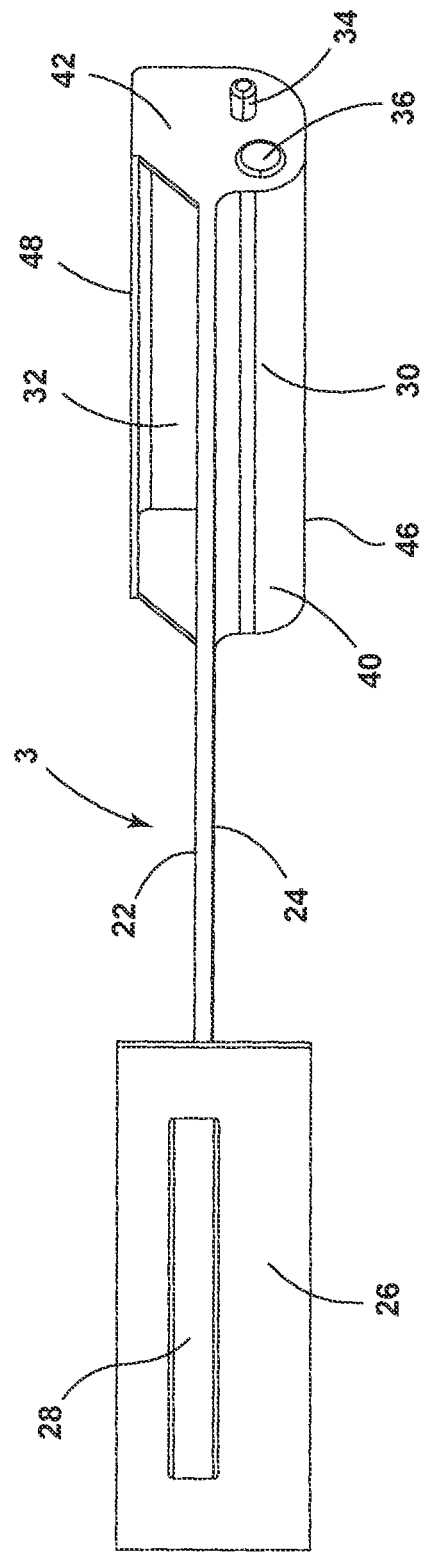
FIG. 11 is a side perspective view of the heating surface utilized with the appliance shown in FIGS. 1-8.
Figure 12:
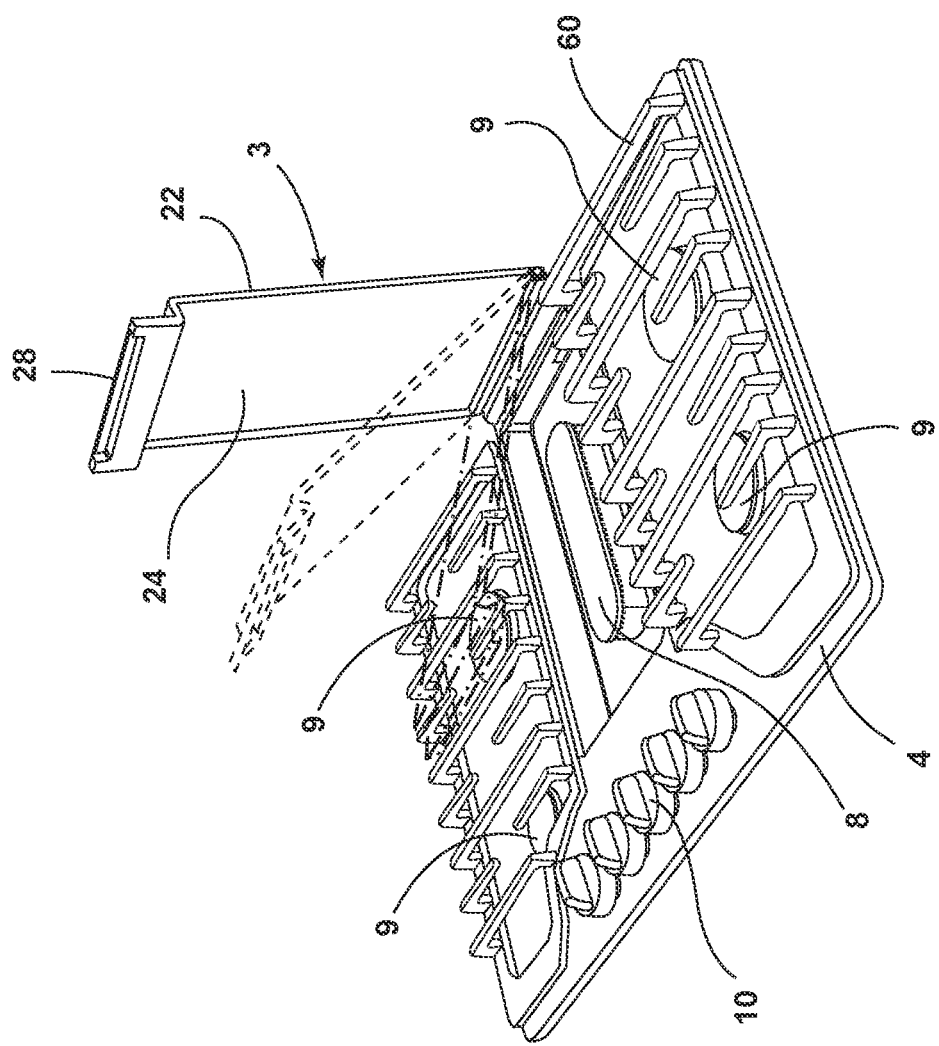
FIG. 12 illustrates the top surface of another embodiment of an appliance with another embodiment of a heating surface that can be rotated into a use and/or stored position with other heating elements on the top surface of the appliance.

Referring to FIGS. 1-12, reference numeral 2 generally denotes an appliance. The appliance can be a freestanding or built-in cooking appliance. The appliance 2 has a top cooking surface that can include a plurality of adjacent heating elements 9 that can be covered with a grate 60 or other surface, as shown in FIG. 12. The appliance 2 has a top surface 4, a front surface 12, a rear surface 14, and side surfaces 15. The appliance 2 includes at least one heating element 8 located on the top surface 4. The heating element 8 is configured to provide heat to a heating surface 3, as illustrated in FIGS. 1-4. The heating element 8 can be controlled by control knob 10. The heating element 8 could be electric, natural gas, propane, or any other type of heating element.

Figure 8:
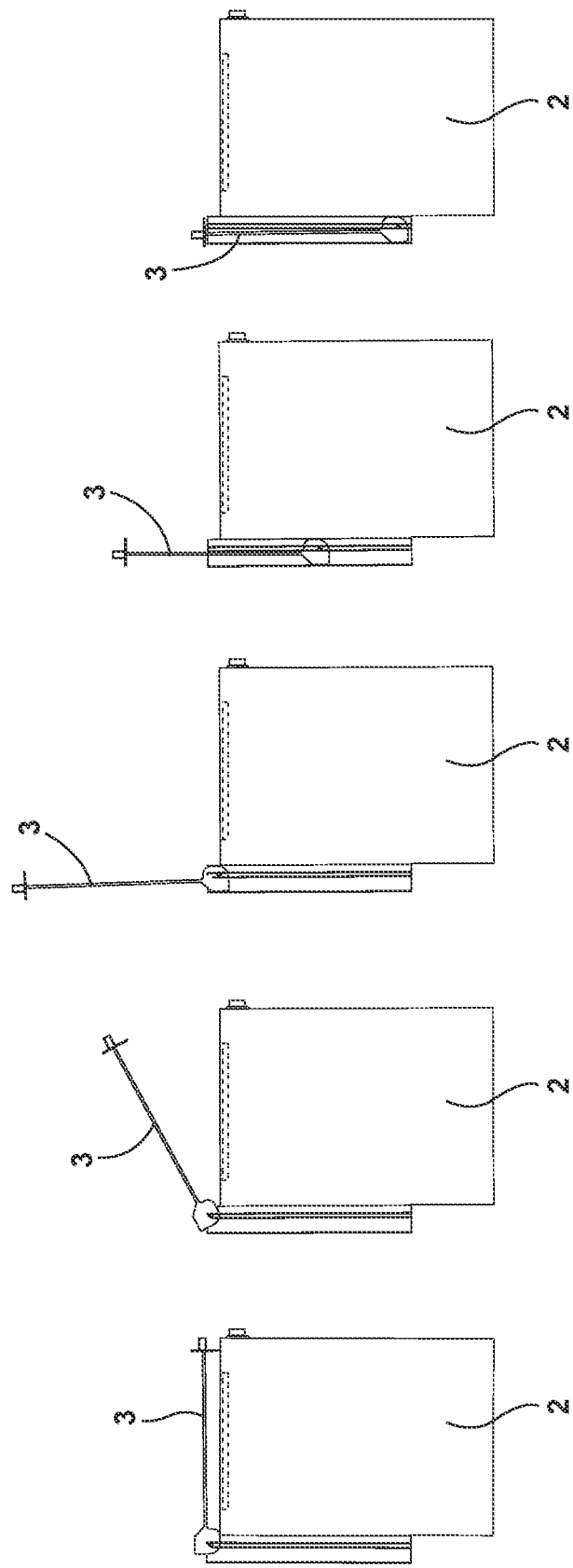
FIG. 8 is a series of side elevational views of the appliance shown in FIG. 1 showing different positions of the heating surface, from a use position on the far left to a stored position on the far right.
Figure 10:
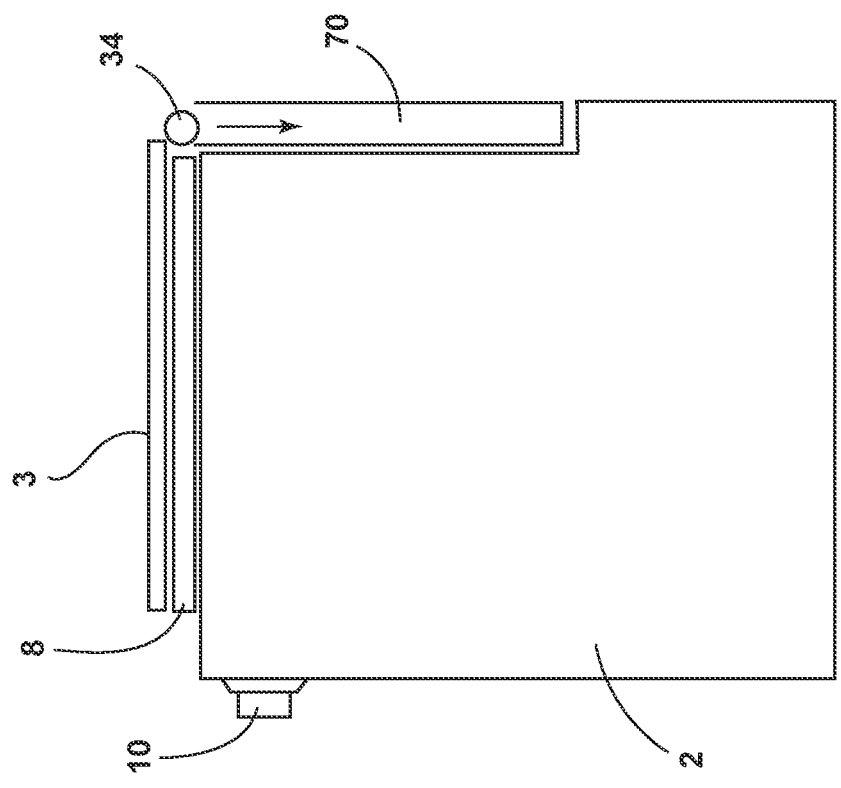
FIG. 10 is a side elevational view of an appliance with the heating surface in a use position utilizing front controls.
Figure 9:
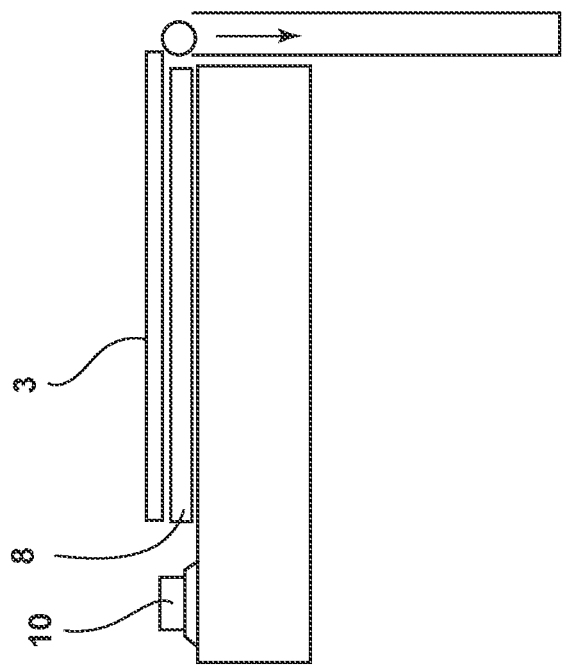
FIG. 9 is a side elevational view of a heating surface located in a use position on an appliance utilizing top controls.

The rear surface 14 of appliance 2 can include a rear compartment 16 configured to house the heating surface 3 when it is rotated into a stored position, as shown in FIG. 4 and on the right side of FIG. 8.

The heating surface 3 includes an upper surface 22 and a lower surface 24 that is disposed opposite the upper surface 22. In the illustrated embodiments, the upper surface 22 and lower surface 24 are generally parallel to each other. However, the thickness of the distance between and the contour of surfaces of the upper surface 24 and lower surface 22 can be non-uniform and/or can alternate, resulting in the upper surface 22 and lower surface 24 not being perfectly parallel. The heating surface 3 also includes a front surface 26 that can include a handle 28, as shown in FIGS. 1-6, 8, and 11-12. The handle 28 can be can have different configurations, as illustrated in FIGS. 11 and 12. The heating surface 3 also includes a grease container 30 positioned opposite the front 26 of the heating surface 3. The grease container 30 includes an opening 32 that is positioned adjacent to at least a portion of the upper surface 22 in order to collect grease and/or other material from upper surface 22 of heating surface 3. The grease container 30 also includes a top surface 48 and a bottom surface 46. The grease container 30 has sidewalls 42 which include a hinge pin 34, as illustrated in FIG. 11. The grease container 30 can also include a port 36, which can be plugged and/or include a valve member to release collected grease from the grease container 30. The lower front surface 40 of the grease container 30 can be curved, as shown in FIG. 11 as it transitions from the lower surface 24 of heating surface 3 to the lower surface 46 of the grease container 30. While the Figures illustrate a single opening 32 of the grease container 30 being positioned along substantially the entire width of the heating surface 3, the opening 32 can include multiple sections and/or cover less than the entire width of the heating surface 3. An optional cover (not shown) can be included over opening 32 to permit the grease to enter into but not exit the opening 32 of the grease container 30. Such a cover could be a member that can only be moved toward the cavity of the grease container 30.

In the illustrated embodiment, the upper surface 22 of heating surface 3 is generally flat and includes sidewalls 44 which help keep the grease and other material on the upper surface 22 of heating surface 3. The upper surface 22 can be generally flat and act as a griddle and/or can include sections with raised projections to act as a grill.

The heating surface 3 can be rotated between a use position and a stored position, as illustrated in FIG. 8. When the heating surface 3 is in a use position, the lower surface 24 of the heating surface 3 is positioned above heating element 8. Heating element 8 can be activated by the control knob 10 to heat the lower surface 24 of heating surface 3. The lower surface 24 can be positioned above the top surface of heating element 8 and/or can contact the top surface of heating element 8 depending upon the type of heating element 8. In the illustrated embodiments, the heating element 8 is positioned within a pocket 17 that is formed within the top surface 4 of the appliance 2. When the heating surface 3 is rotated into the use position, the upper surface 22 can be substantially flush with the surrounding heating elements of the appliance 2, as shown in FIG. 12. As illustrated in FIG. 12, the top surface 22 of the heating surface 3 would be substantially flush with the top surface of the grate 60 when the heating element 3 is rotated into a use position.

The hinge pins 34 of the sidewalls 42 of the grease container 30 are received in hinge pin grooves 18 on the appliance 2. In the illustrated embodiments, the hinge pin grooves 18 are formed between raised walls. However, the hinge pin grooves 18 could be recessed into the housing of the appliance 2. In the embodiment illustrated in FIGS. 1-8, the hinge pin grooves 18 are on the side surfaces 15 of the appliance 2. In the embodiment shown in FIG. 12, the hinge pin grooves 18 are on the rear surface 14 of appliance 2. The hinge pin grooves 18 can be formed on or coupled to one or more of the side surfaces 15 or rear surface 14 of appliance 2. The hinge pin grooves 18 permit the rotation of the heating surface 3 from a use position wherein the upper surface 22 of heating surface 3 is positioned generally parallel to the top surface 4 of the appliance 2 to a stored position wherein the upper surface 22 of the heating surface 3 is positioned in generally perpendicular to the top surface 4 of appliance 2. While the heating surface 3 is rotated from a use position to a stored position, grease and other material that remains on the upper surface 22 of the heating surface 3 can be collected in grease container 30 by gravitational forces. The hinge grooves 18 include a gap 21 formed in the hinge pin grooves 18 to permit removal of the heating surface 3 from the appliance 2. The gap 21 can be formed between a portion of the top wall 23 and a portion of the sidewall 25 of the hinge pin grooves 18. In the illustrated embodiment, the gap 21 is positioned so that it faces away from the front surface 12 of appliance 2. The heating surface 3 can be removed from the appliance 2 to clean the heating surface 3 and/or to drain the grease container 30. The grease container 30 can be drained by removing the plug or actuating a valve member that is within the port 36 located on one of the sidewalls 42 of the grease container 30. If the valve member is used, it could be a bleeder valve or any other member that can be compressed to create an opening adjacent to or within the port 36. If a plug is used, the plug can be removed from the port 36.

When the heating surface 3 is in a stored position, the heating surface 3 can be positioned within a compartment 16 located behind the rear wall 14 of the appliance 2. Alternatively, the heating surface 3 could be stored in an entirely open or partially open area positioned behind the rear wall 14 of appliance 2.

While the illustrated embodiments illustrate a single heating element 8 that is used to heat the lower surface 24 of heating surface 3, more than one heating element 8 can be used to heat the lower surface 24 of heating surface 3.

According to one aspect of the present disclosure is an appliance with a storable heating surface, that has a front surface, a top surface, a rear surface, hinge pin grooves, and at least one heating element positioned on said top surface of said appliance. The heating surface has a top cooking surface, a lower surface positioned opposite the top cooking surface, a front surface with a handle, and a grease container positioned opposite the front surface. The grease container includes a top surface, a bottom surface, and two opposed sidewalls to define a grease collection cavity. The grease container includes an opening adjacent to the top cooking surface to collect grease from said top cooking surface. The grease container includes a hinge pin on each sidewall of the grease container, wherein hinge pins are received in the hinge pin grooves of said appliance. The heating surface can be in a storage position with the heating surface positioned adjacent to the rear surface of the appliance with the top cooking surface being generally perpendicular to said top surface of said appliance. The heating surface can be rotated to a use position, by movement of the hinge pins with respect to the hinge pin grooves, such that the lower surface of the heating surface is positioned above at least one heating element and the top cooking surface of the heating surface is generally parallel to the top surface of the appliance.

According to another aspect, a top cooking surface of a heating element includes a flat cooking surface.

According to another aspect, a top cooking surface of a heating element includes a plurality of raised sections on a cooking surface.

According to another aspect, a grease container includes a plugged port on a sidewall of the grease container.

According to another aspect, a top cooking surface of a heating surface is substantially flush with the top surface of an appliance when a heating surface is in a use position.

According to another aspect, a top cooking surface includes a raised front wall and raised sidewalls.

According to another aspect, a rear portion of a top cooking surface is flat adjacent to an opening in a grease container.

According to another aspect, a top surface of a grease container is positioned parallel to and above the plane of a top cooking surface of a heating surface.

According to another aspect of the present disclosure, a cooking appliance with a rotatable heating surface, having a front surface, a top surface, a rear surface, hinge pin grooves, and at least one heating element positioned on said top surface of the cooking appliance. A heating surface having has a top cooking surface, a lower surface positioned opposite the top cooking surface, a front surface with a handle, and a grease container positioned opposite the front surface. The grease container includes a top surface, a bottom surface, and two opposed sidewalls to define a grease collection cavity. The grease container includes an opening adjacent to the top cooking surface to collect grease from the top cooking surface. The grease container includes a hinge pin on each sidewall of the grease container. The hinge pins are received in the hinge pin grooves of the cooking appliance. The heating surface can be in a storage position with the heating surface positioned adjacent to the rear surface of the cooking appliance with the top cooking surface being generally perpendicular to the top surface of the cooking appliance. The heating surface can be rotated to a use position, by movement of the hinge pin with respect to the hinge pin grooves, such that the lower surface of the heating surface is positioned above the at least one heating element. The cooking appliance includes one or more heating elements that are positioned on said top surface adjacent to the heating surface when the heating surface is in a use position.

According to another aspect, a top cooking surface of a heating element includes a flat cooking surface.

According to another aspect, a top cooking surface of a heating element includes a plurality of raised sections on a cooking surface.

According to another aspect, a grease container includes a plugged port on a sidewall of a grease container.

According to another aspect, a top cooking surface of said heating surface is substantially flush with the top surface of a cooking appliance when a heating surface is in a use position.

According to another aspect, a top cooking surface includes a raised front wall and raised sidewalls.

According to another aspect, a rear part of a top cooking surface is flat adjacent to a opening in a grease container.

According to another aspect, a top surface of a grease container is positioned parallel to and above the plane of a top cooking surface of a heating surface.

According to another aspect of the disclosure, a cooking appliance with a storable heating surface, having a front surface, a top surface, a rear surface, hinge pin grooves, and a plurality of heating elements positioned on the top surface of the cooking appliance. The heating surface having a top cooking surface, a lower surface positioned opposite the top cooking surface, a front surface with a handle, and a grease container positioned opposite the front surface. The grease container includes a top surface, a bottom surface, and two opposed sidewalls to define a grease collection cavity. The grease container includes an opening adjacent to the top cooking surface to collect grease from the top cooking surface. The grease container includes a hinge pin on each sidewall of the grease container. The hinge pins are received in the hinge pin grooves on the cooking appliance. The heating surface can be in a stored position with the heating surface positioned adjacent to the rear surface of the cooking appliance with the top cooking surface being generally perpendicular to the top surface of the cooking appliance. The heating surface can be rotated to a use position, by movement of the hinge pin with respect to the hinge pin grooves, such that the lower surface of the heating surface is positioned above at least one of the plurality of heating elements and the top cooking surface of the heating surface is generally parallel to the top surface of the cooking appliance and the top surface of other plurality of heating elements.

According to another aspect, a top cooking surface of a heating element includes a flat cooking surface.

According to another aspect, a top cooking surface of a heating element includes a plurality of raised sections on a cooking surface.

According to another aspect, a grease container includes a plugged port on a sidewall of a grease container.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance with a storable heating surface, comprising:
    an appliance having a front surface, a top surface, a rear surface, hinge pin grooves, and at least one heating element positioned on said top surface of said appliance;
    a heating surface having:
        a top cooking surface, a lower surface positioned opposite said top cooking surface, a front surface with a handle, and a grease container positioned opposite said front surface;
        wherein said grease container includes a top surface, a bottom surface, and two opposed sidewalls to define a grease collection cavity;
        wherein said grease container includes an opening adjacent to said top cooking surface to collect grease from said top cooking surface;
        wherein said grease container includes a hinge pin on each sidewall of the grease container;
        wherein said hinge pins are received in said hinge pin grooves on said appliance;
    wherein said heating surface can be in a storage position with the heating surface positioned adjacent to said rear surface of said appliance with said top cooking surface being generally perpendicular to said top surface of said appliance; and
    wherein said heating surface can be rotated to a use position, by movement of said hinge pins with respect to said hinge pin grooves, such that said lower surface of said heating surface is positioned above said at least one heating element and said top cooking surface of said heating surface is generally parallel to said top surface of said appliance.

2. The appliance of claim 1, wherein said top cooking surface of said heating element includes a flat cooking surface.

3. The appliance of claim 1, wherein said top cooking surface of said heating element includes a plurality of raised sections on said cooking surface.

4. The appliance of claim 1, wherein said grease container includes a plugged port on a sidewall of said grease container.

5. The appliance of claim 1, wherein said top cooking surface of said heating surface is substantially flush with the top surface of said appliance when said heating surface is in a use position.

6. The appliance of claim 1, wherein said top cooking surface includes a raised front wall and raised sidewalls.

7. The appliance of claim 6, wherein the rear portion of said top cooking surface is flat adjacent to said opening in said grease container.

8. The appliance of claim 1, wherein said top surface of said grease container is positioned parallel to and above the plane of said top cooking surface of said heating surface.

9. A cooking appliance with a rotatable heating surface, comprising:

a cooking appliance having a front surface, a top surface, a rear surface, hinge pin grooves, and at least one heating element positioned on said top surface of said cooking appliance;

a heating surface having:
- a top cooking surface, a lower surface positioned opposite said top cooking surface, a front surface with a handle, and a grease container positioned opposite said front surface;
- wherein said grease container includes a top surface, a bottom surface, and two opposed sidewalls to define a grease collection cavity;
- wherein said grease container includes an opening adjacent to said top cooking surface to collect grease from said top cooking surface;
- wherein said grease container includes a hinge pin on each sidewall of the grease container;
- wherein said hinge pins are received in said hinge pin grooves of said cooking appliance;
- wherein said heating surface can be in a storage position with the heating surface positioned adjacent to said rear surface of said cooking appliance with said top cooking surface being generally perpendicular to said top surface of said cooking appliance;
- wherein said heating surface can be rotated to a use position, by movement of said hinge pins with respect to said hinge pin grooves, such that said lower surface of said heating surface is positioned above said at least one heating element; and
- wherein said cooking appliance includes one or more heating elements that are positioned on said top surface adjacent to said heating surface when said heating surface is in a use position.

10. The cooking appliance of claim 9, wherein said top cooking surface of said heating element includes a flat cooking surface.

11. The cooking appliance of claim 9, wherein said top cooking surface of said heating element includes a plurality of raised sections on said cooking surface.

12. The cooking appliance of claim 9, wherein said grease container includes a plugged port on a sidewall of said grease container.

13. The cooking appliance of claim 9, wherein said top cooking surface of said heating surface is substantially flush with the top surface of said cooking appliance when said heating surface is in a use position.

14. The cooking appliance of claim 9, wherein said top cooking surface includes a raised front wall and raised sidewalls.

15. The cooking appliance of claim 14, wherein the rear part of said top cooking surface is flat adjacent to said opening in said grease container.

16. The cooking appliance of claim 9, wherein said top surface of said grease container is positioned parallel to and above the plane of said top cooking surface of said heating surface.

17. A cooking appliance with a storable heating surface, comprising:

a cooking appliance having a front surface, a top surface, a rear surface, hinge pin grooves, and a plurality of heating elements positioned on said top surface of said cooking appliance;

a heating surface having:
- a top cooking surface, a lower surface positioned opposite said top cooking surface, a front surface with a handle, and a grease container positioned opposite said front surface;
- wherein said grease container includes a top surface, a bottom surface, and two opposed sidewalls to define a grease collection cavity;
- wherein said grease container includes an opening adjacent to said top cooking surface to collect grease from said top cooking surface;
- wherein said grease container includes a hinge pin on each sidewall of the grease container;
- wherein said hinge pins are received in said hinge pin grooves on said cooking appliance;
- wherein said heating surface can be in a stored position with the heating surface positioned adjacent to said rear surface of said cooking appliance with said top cooking surface being generally perpendicular to said top surface of said cooking appliance; and
- wherein said heating surface can be rotated to a use position, by movement of said hinge pins with respect to said hinge pin grooves, such that said lower surface of said heating surface is positioned above at least one of said plurality of heating elements and said top cooking surface of said heating surface is generally parallel to said top surface of said cooking appliance and the top surface of other plurality of heating elements.

18. The cooking appliance of claim 17, wherein said top cooking surface of said heating element includes a flat cooking surface.

19. The cooking appliance of claim 17, wherein said top cooking surface of said heating element includes a plurality of raised sections on said cooking surface.

20. The cooking appliance of claim 17, wherein said grease container includes a plugged port on a sidewall of said grease container.

* * * * *